Oct. 19, 1926.
C. W. OTT
1,603,637
ELECTRIC LAWN MOWER
Filed Dec. 8, 1924   3 Sheets-Sheet 1
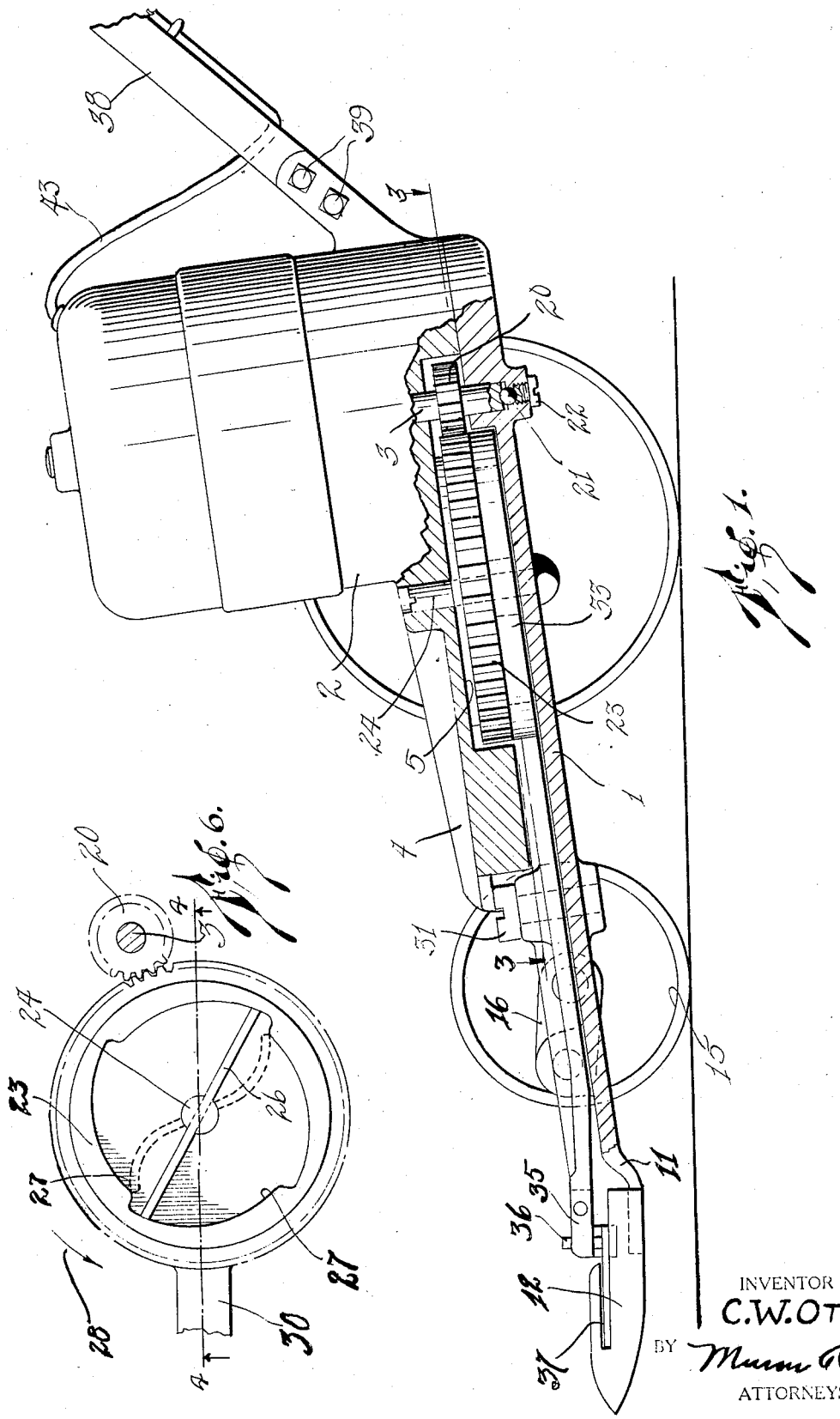

Oct. 19, 1926.
C. W. OTT
1,603,637
ELECTRIC LAWN MOWER
Filed Dec. 8, 1924     3 Sheets-Sheet 2
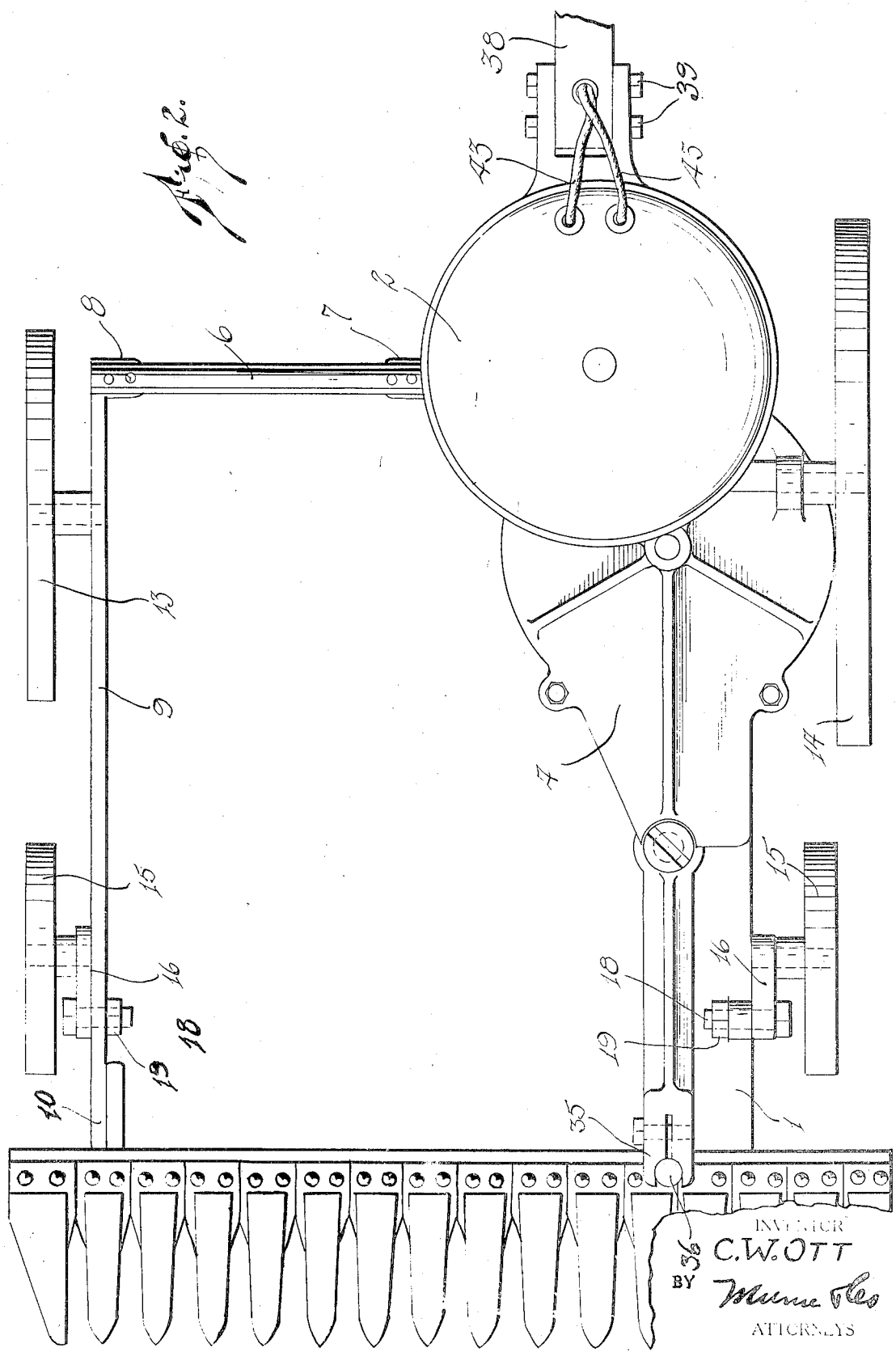
INVENTOR
C.W. OTT
BY
ATTORNEYS Oct. 19, 1926.                     C. W. OTT                     1,603,637
                             ELECTRIC LAWN MOWER
                            Filed Dec. 8, 1924                3 Sheets-Sheet 3
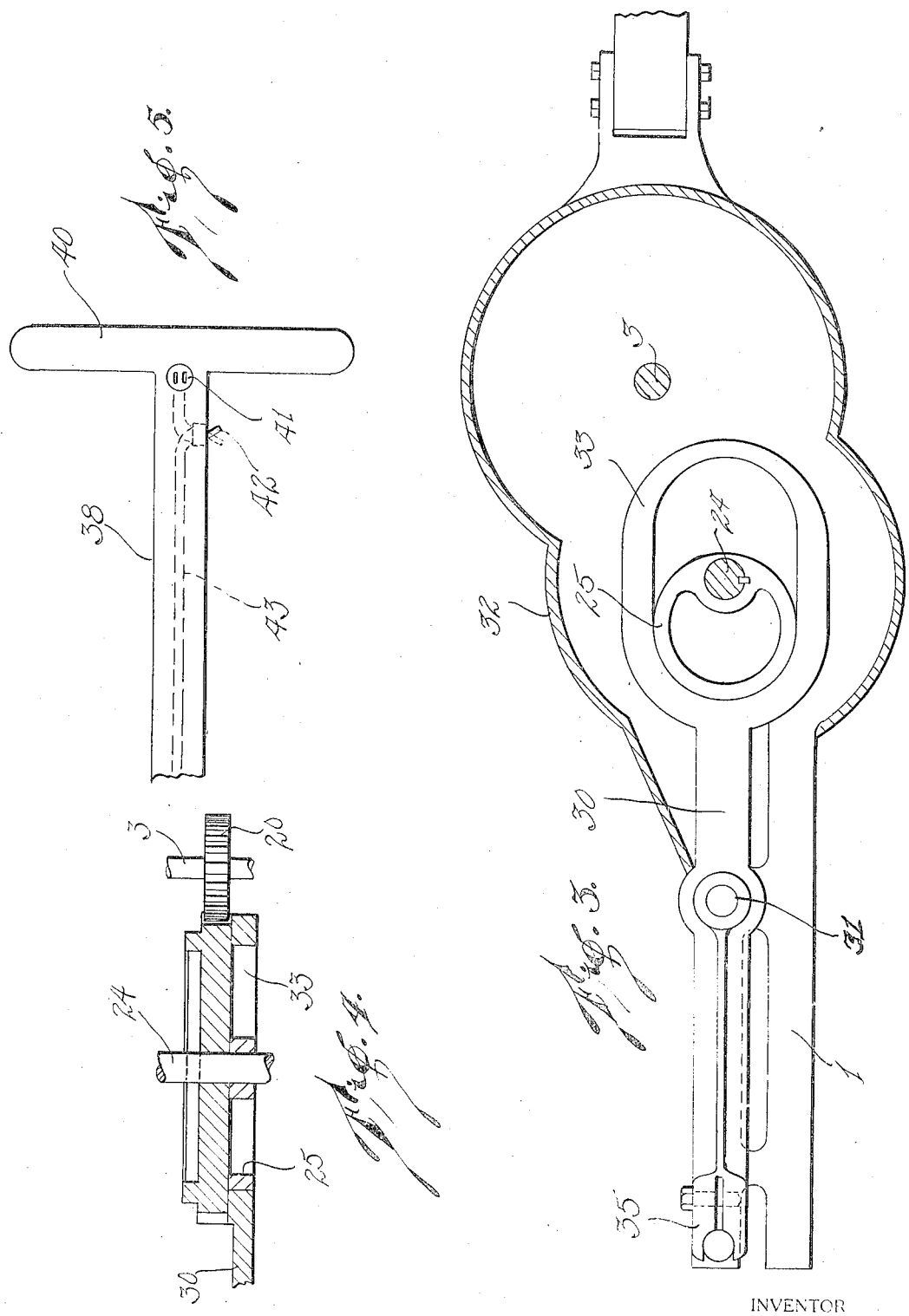
INVENTOR
C. W. OTT
BY
ATTORNEYS Patented Oct. 19, 1926.

1,603,637

UNITED STATES PATENT OFFICE.

CHARLES WALTER OTT, OF PITTSBURG, KANSAS.

ELECTRIC LAWN MOWER.

Application filed December 8, 1924. Serial No. 754,577.

My invention relates to improvements in electric lawn mowers, and it consists in the combinations, constructions, and arrangements herein described and claimed.

An object of my invention is to provide an electric lawn mower of the type described in which the power for operating the blades of the lawn mower is derived from the ordinary house lighting current source from which a suitable conductor is provided which extends to a convenient point on or near the grass plot to be mowed. This construction obviates the manual toil ordinarily necessary for operating the blades of the mower aside from that work involved in moving the lawn mower across the lawn.

A further object of my invention is to provide a device of the type described in which particularly novel means is employed for preventing damage to the gears and power transmitting means by unintentional lodgement of sticks, pebbles, and the like between the cutting blades, as may well be expected to occur from time to time in the normal use of such a device.

A further object of my invention is to provide an electric lawn mower of the type described in which all of the power transmitting mechanism is encased in a housing, thereby preventing grass, grit, and the like, from gaining access to the moving parts, and for preventing damage to the person using the device through inadvertence in handling the mower while the motor is in action, as in adjustments and the like.

A further object of my invention is to provide an electric lawn mower of the type described which is adaptable for use with blades of various widths, depending upon the needs of the user, and which employs a standard size of carriage for blades of various widths.

A further object of my invention is to provide a device of the type described in which simple and efficient means is provided for adjusting the elevation of the blades relative to the level of the lawn, whereby the height of the cut grass may be determined.

A further object of my invention is to provide a device of the type described which is simple in construction, durable, and efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention with a part thereof broken away, Figure 2 is a top plan view of the mechanism illustrated in Figure 1, Figure 3 is a sectional view substantially along the line 3—3 of Figure 1, Figure 4 is a sectional view along the line 4—4 of the mechanism illustrated in Figure 6, Figure 5 is a top plan view of the handle employed for guiding the mower, and Figure 6 is a top plan view of the mechanism illustrated in Figure 4.

In carrying out my invention I make use of a body member 1 upon which an electric motor 2 is mounted with its shaft 3 perpendicular to the plane of the body member 1. The outer casing of the motor 2 is formed integral with a cover plate 4 disposed above the body member 1 which cooperates with the body member to form a housing 5.

A laterally extending bar 6 is secured to the motor 2 at 7 and is secured at its outer end 8 with the rear end of a frame member 9.

The forward end 10 of the frame member 9 and the forward end 11 of the body member 1 are secured at opposite ends respectively to a stationary cutting blade 12 of the sickle type.

A pair of wheels 13 and 14 are rotatably mounted upon the frame 9 and cover plate 4 respectively, so as to movably support the rearward end of the mower.

The forward end of the mower is movably suported upon a pair of wheels 15 of lesser diameter than the wheels 13 and 14, which are rotatably mounted upon arms 16. The arms 16 are pivotally mounted to the frame 9 and body member 1 respectively, by the provision of bolts 18. These bolts 18 have lock nuts 19 associated therewith, whereby the arms may be set in any predetermined position, thus permitting vertical adjustment of the forward end of the mower and vertical adjustment of the cutting blade 12.

A pinion 20 is carried adjacent to the lower end of the motor shaft 3. This motor shaft 3 is provided with a ball thrust bearing 21 at the lower end, which rests upon an adjustable bearing screw 22. This is for the purpose of relieving friction due to the weight of the armature of the motor.

The pinion 20 is in mesh with a gear 23 which is rotatably mounted upon an upright shaft 24, (see Figure 1). Thus the gear 23 may turn freely upon the shaft 24.

The shaft 24 (see Figure 3) is keyed to an eccentric plate 25 disposed beneath the gear 23.

Means for yieldingly connecting the gear 23 with the shaft 24 so that the gear may drive the shaft under ordinary conditions is provided for in a band spring 26 projected through the shaft 24 at right angles thereto. The inner peripheral wall of the gear 23 has a plurality of ratchet-like teeth 27 which engage with the spring 26 when the gear is rotated in the direction of the arrow 28 as under normal operation of the motor 2. If, however, great resistance is exerted against rotation of the shaft 24, the spring 26 will flex sufficiently to permit the gear 23 to turn without movement of the shaft 24. This is what occurs when the blades of the mower are obstructed by foreign substances in the manner hereinafter described. A blade operating lever 30 is pivotally mounted at 31 upon the body member 1, a portion of the lever extending within the casing formed by the cover plate 4 and the body member. It should be noted at this time, from inspection of Figure 3 that the body member 1 has upwardly extending side walls 32 which cooperate with the cover plate 4 in forming the casing referred to. The innermost end of the lever 31 is in the shape of an elongated annulus 33, which encompasses the eccentric plate 25 in such a manner as to cause the oscillation of the lever 30 upon its pivotal mounting 31 as the eccentric rotates with the shaft 24. The outermost end of the lever 30, as shown at 35, is connected with an upstanding lug 36 carried by a movable blade 37 which cooperates with the stationary blade 12 to form the cutting blades of the mower. These cutting blades are of ordinary construction, and well known in the art.

The mower is provided with a handle member 38 which is secured at 39 to the housing of the motor 2. This handle member has a transverse hand grip 40 at the upper end thereof, much the same as the construction of the ordinary type of mower handle, by means of which the mower may be guided upon the lawn upon its wheels 13—14—15.

An electrical receptacle 41 is disposed upon the handle member 38 upon the upper end thereof, and an electric switch 42 is embedded in the handle beneath the hand grips 40. A suitable connecting wire 43, as shown in dotted lines in Figure 5 and in full lines in Figures 1 and 2, is provided for the purpose of electrically connecting the receptacle 41 with the motor 2, through the switch 42, whereby current may be provided for the motor 2 for actuation of the device.

From the foregoing description of the various parts of the device, the operation thereof may be readily understood. In employing my improved lawn mower I first connect a suitable plug to the receptacle 41. I then actuate the switch 42 so as to permit current to pass to the motor 2. As the motor 2 is actuated, the shaft 3 thereof will revolve and the gear 23 will be driven by the pinion 20 which is on the shaft 3. If no obstructions are between the blades 37 and 12, the gear 23 will drive the shaft 24 by virtue of the teeth 27, and a spring 26 associated with the shaft. As the shaft 24 is revolved the eccentric plate 25 will also move about the axis of the shaft, causing an oscillatory movement of the lever 30.

As the lever 30 oscillates, the movable blade 37 will reciprocate longitudinally and the teeth of the blade will cross the teeth of the stationary blade 12, thereby severing the grass brought between the moving teeth of the blades in precisely the same manner as the ordinary type of tractor operated sickle lawn mower.

If it is desirable to vary the height of the grass, it is merely necessary to adjust the lock nuts 19 associated with the bolts 18 and the arms 16 and to change the position of the arms until the blades are at the proper distance from the ground. The lock nuts 19 are than tightened and the device is again ready for use.

One of the most important advantages attained with my improved lawn mower is that very little manual effort is necessary to manipulate the device, though the blades are of greater length than the ordinary type of manually operated mower. This is due to the fact that all of the work of moving the blades is performed by the motor 2 and the operator has merely to move the device from place to place over the lawn. Another advantage is that the blades of the mower move just as rapidly when the mower is at a standstill, as in trimming, as when the mower is moving across the lawn.

I claim:

1. An electric lawn mower of the character described comprising a carriage constructed for manual locomotion over a lawn, an electric motor mounted on the carriage, a stationary cutting blade carried by the carriage, and a reciprocable cutting blade associated with the stationary cutting blade, an eccentric plate, a pivot lever connected with said movable blade and with said eccentric plate for reciprocating the movable blade upon the rotation of the eccentric plate, said eccentric plate having a shaft keyed thereto, and a spring projected transversely therethrough and extending radially from opposite sides of the shaft, and a gear driven by said motor, said gear having radial inwardly extending ratchet teeth adapted to engage with the spring to yieldingly drive said shaft.

2. An electric lawn mower of the character described comprising a carriage constructed for manual locomotion over a lawn, an electric motor mounted on the carriage, a stationary cutting blade carried by the carriage, and a reciprocable cutting blade associated with the stationary cutting blade, an eccentric plate, a pivot lever connected with said movable blade and with said eccentric plate for reciprocating the movable blade upon the rotation of the eccentric plate, said eccentric plate having a shaft keyed thereto, and a spring projected transversely therethrough and extending radially from opposite sides of the shaft, and a gear driven by said motor, said gear having radial inwardly extending ratchet teeth adapted to engage with the spring to yieldingly drive said shaft, said ratchet teeth having gradually inclined surfaces on one side and having its outermost portion curved, whereby the spring may readily slip thereover when the resistance to rotation of the shaft is sufficiently great.

CHARLES WALTER OTT.